United States Patent
Basson et al.

(10) Patent No.: US 7,539,296 B2
(45) Date of Patent: May 26, 2009

(54) METHODS AND APPARATUS FOR PROCESSING FOREIGN ACCENT/LANGUAGE COMMUNICATIONS

(75) Inventors: Sara H. Basson, White Plains, NY (US); Alexander Faisman, Croton-on-Hudson, NY (US); Dimitri Kanevsky, Ossining, NY (US); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 10/955,996

(22) Filed: Sep. 30, 2004

(65) Prior Publication Data

US 2006/0067508 A1 Mar. 30, 2006

(51) Int. Cl.
*H04M 3/00* (2006.01)
(52) U.S. Cl. .............................. 379/265.12; 379/265.01; 379/265.02; 704/277
(58) Field of Classification Search ............ 379/265.12, 379/221.1, 265.01, 221.01, 265.02, 265.13, 379/266.01, 266.02, 266.12; 704/277, 235
See application file for complete search history.

(56) References Cited

U.S. PATENT DOCUMENTS

| | | | | |
|---|---|---|---|---|
| 6,100,882 A | * | 8/2000 | Sharman et al. | 704/235 |
| 6,798,876 B1 | * | 9/2004 | Bala | 379/265.12 |
| 6,847,714 B2 | * | 1/2005 | Das et al. | 379/265.12 |
| 6,985,850 B1 | * | 1/2006 | Scanlan | 704/2 |
| 2003/0069729 A1 | * | 4/2003 | Bickley et al. | 704/236 |
| 2004/0044517 A1 | * | 3/2004 | Palmquist | 704/7 |

* cited by examiner

*Primary Examiner*—Curtis Kuntz
*Assistant Examiner*—Amal Zenati
(74) *Attorney, Agent, or Firm*—Anne V. Dougherty; Ryan, Mason & Lewis, LLP (57) ABSTRACT

Techniques for improving the efficiency of foreign accent/language communications processing are disclosed. For example, in one aspect of the invention, a technique for processing a call received by a call center, includes the following steps/operations. A call is obtained. Then, at least one of an accent and a language spoken by a caller making the call is identified. The call is then directed to an appropriate operator at a first level of the call center based on at least one of the automatically identified accent and the automatically identified language. The techniques may also include multiple-purpose editing, automated translation, and restating methodologies.

9 Claims, 6 Drawing Sheets

METHODS AND APPARATUS FOR PROCESSING FOREIGN ACCENT/LANGUAGE COMMUNICATIONS

FIELD OF THE INVENTION

The present invention relates to techniques for processing foreign accent/language communications and, more particularly, to techniques for improving the efficiency of foreign language communications processing.

BACKGROUND OF THE INVENTION

The fact that certain aspects of modem businesses and other entities, such as governmental agencies or bodies, may be multi-lingual or multi-dialectic in nature requires that communications in a foreign language or foreign dialect, encountered in accordance with the business or entity, be handled efficiently. Also, it is desirable that communications involving foreign accents (e.g., communications wherein a person speaks in a language other than the person's native language) be handled efficiently.

By way of example, in the context of a business, employees from a certain country are often required to make international telephone calls through a call center. As is known, a "call center" generally refers to a department within a company or a third-party organization that handles telephone services. It is generally necessary for the call center to try to accommodate the caller in any way possible. For example, an employee working in England calling India would best be assisted in a call center by a person that speaks English, rather than by a person that speaks an Indian language. Also, it would be desirable for a person speaking with a foreign accent to be serviced by someone familiar with the accent.

By way of further example, some government bodies such as the Parliament in India require proceedings to be made available in transcripts respectively written in the multiple languages and/or dialects that exist in India.

SUMMARY OF THE INVENTION

Principles of the present invention provide techniques for improving the efficiency of foreign accent/language communications processing.

For example, in one aspect of the invention, a technique for processing a call received by a call center includes the following steps/operations. A call is obtained. Then, at least one of an accent and a language spoken by a caller making the call is identified. The call is then directed to an appropriate operator at a first level of the call center based on at least one of the automatically identified accent and the automatically identified language. The techniques may also include multiple-purpose editing, automated translation, and restating methodologies.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that while principles of the present invention will be described below in the context of a call center environment, the invention is not intended to be so limited. Rather, principles of the invention are more generally applicable to any multi-lingual or multi-dialect environment in which it would be desirable to efficiently and effectively process any foreign language/accent communications.

As used herein, the term "language" may illustratively refer to communication of thoughts and feelings through a system of arbitrary signals, such as voice sounds, gestures, or written symbols. A "dialect" may illustratively refer to a regional or social variety of a language distinguished by pronunciation, grammar, or vocabulary, especially a variety of speech differing from the standard literary language or speech pattern of the culture in which it exists. An "accent" may illustratively refer to a characteristic pronunciation, especially one determined by the phonetic habits of the speaker's native language carried over to his or her use of another language.

As will be illustratively explained herein, principles of the present invention provide techniques for determining the accent or natural language of a person via an automated accent/language identification system and/or by using a history if the caller has used the service before. The invention allows for a more efficient way for assisting customers since callers are able to communicate their questions and problems in an accent/language that is most comfortable for them after they have been paired with an operator who either speaks or is familiar with the caller's accent/language. Advantageously, a caller will be directed to such an appropriate operator even if the caller does not expressly identify his accent or language to the operator.

As is known, call centers typically have tiered levels of assistance. For example, level 1 provides primary assistance and then a second level, level 2, provides more intense assistance. More levels may be provided. Thus, by way of example, suppose that a Russian caller contacts a Russian-speaking call center at Level 1. Suppose further that the caller shows a need for assistance in the second level. Assume that the second level operator speaks Chinese, and would have to question the caller about the problem previously explained in Level 1. Therefore, accommodating for the caller by providing a technique for transferring the caller's problem from level to level is an obligation of the call center.

In accordance with principles of the present invention, if a caller speaks in Russian or with a Russian accent, he or she will be redirected to a Russian operator. The conversation between the operator and the caller is transcribed using a speech recognition system and automatically translated to the appropriate language for both the caller and operator.

The transcription at the primary level 1 is transferred to the second level to increase efficiency. The technique may also utilize an editor to fix any errors in translation or speech recognition when transferring data between level 1 and level 2. Multiple editors may be used to allow real-time editing. It is to be understood that the techniques of the invention are adaptable for use outside the call center environment. For example, a multi-lingual Indian parliament could use the active translation techniques of the invention.

Principles of the invention also provide techniques for producing text-based services (e.g., translation, summarization, simplification). More particularly, a re-stating technique is used by a human expert or an automated system to transform input data into a form that allows the data to be more efficiently automatically processed.

For example, assume that it is necessary to translate a speech from one language (e.g., English) to another language (e.g., Russian). One way to do this is to process the speech through an English-based speech recognition system, and then process the resulting English text through Russian machine translation, and then edit. This approach may generate so many errors that editing will be costly. Thus, principles of the invention provide a re-stating technique.

Re-stating may occur as follows. A person who hears English speech repeats the English speech in a simpler form. The speech may be repeated in either English or some other language, e.g., Russian. Since the resulting speech will be simpler, automatic speech recognition or machine translation will have fewer errors. A re-stating expert could re-state speech in some form that he or she knows will be more easily processed by a machine. For example, the re-stating expert can replace a passive language form with some direct form, or replace confusable sounding words with non-confusable words, or split long sentences into a few shorter ones. This restating approach can also be used for other forms of machine processing, e.g., automatic summarization and automatic simplification.

Figure 1:
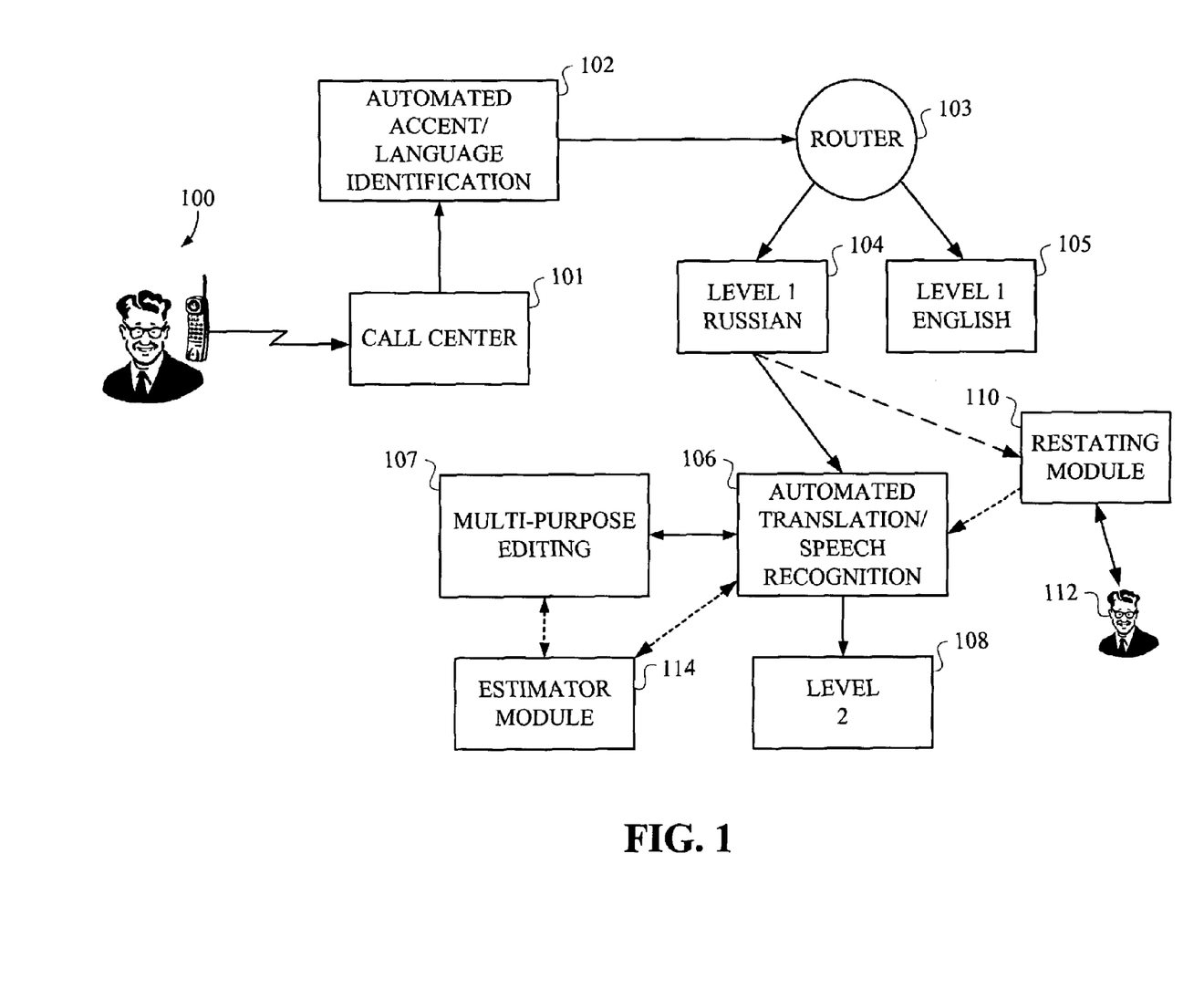
FIG. 1 is a diagram generally illustrating a call center system according to an embodiment of the present invention.

Referring initially to FIG. 1, a diagram generally illustrates a call center system according to an embodiment of the present invention. As shown, a caller 100 contacts call center 101. The accent or language of the caller is identified using automated accent/language identification system 102; operatively connected to call center 101. Router 103, operatively connected to automated accent/language identification system 102, directs the call to the appropriate level 1 operator, depending on the person's accent/language as determined by automated system 102. In this example, this could be a Russian level 1 operator 104 or an English level 1 operator 105.

If the caller is sent to the Russian level 1 operator 104, the conversation between the caller and operator is automatically translated by automated translation system 106. System 106 also includes a speech recognizer. More particularly, the conversation is translated to the language familiar to the level 2 operator 108. Multi-purpose editor 108 can edit speech parts or translation parts of text or audio. The above operations will be further explained below.

With continued reference to FIG. 1, a restating module 110 is shown as being operatively coupled between level 1 operator 104 and automated translation system 106. As shown in FIG. 1, the connection between level 1 operator 104 and automated translation system 106 can be direct or through restating module 110. Thus, when utilized, restating module 110 receives input from the level 1 operator and sends output to automated translation system 106. A restating operator 112 is shown as interfacing with restating module 110.

As mentioned above, restating module 110 stores a recording provided by restating operator 112 which represents a simplified version of the speech that was received from the level 1 operator (and the caller). Thus, restating module 110 stores a simple recording of what operator 112 restated, prior to it being provided to automated translation system 106. In this case, restating is done from speech to speech in the same language, and thus, advantageously, system 106 will receive a simpler speech to translate.

Another case happens when restating is performed in another language, which still provides speech that is simpler than the original speech input. For example, assume that the original speech is Russian. The simplified speech may be translated by the operator 112 from Russian into a simplified English version. Automated translation system 106 may then translate the simplified English speech into German. Similar approaches may be taken for other textual processes such as summarization, etc.

Also shown in FIG. 1 is estimator module 114. Module 114 estimates the cost and time using different methods of transformation of speech into text (or other speech) and advices the best path, e.g., either direct translation or restating. Module 114 may be connected to modules whose quality it estimates, such as translation system 106, editor 107, etc. In the case of long speeches, estimator 114 allows the use of duplicate efforts at the beginning (e.g., direct translation and re-stating then translation is done simultaneously). Then, when the most efficient method is estimated, the most efficient method is selected and performed (e.g., only machine translation, or re-stating and then machine translation).

Figure 2:
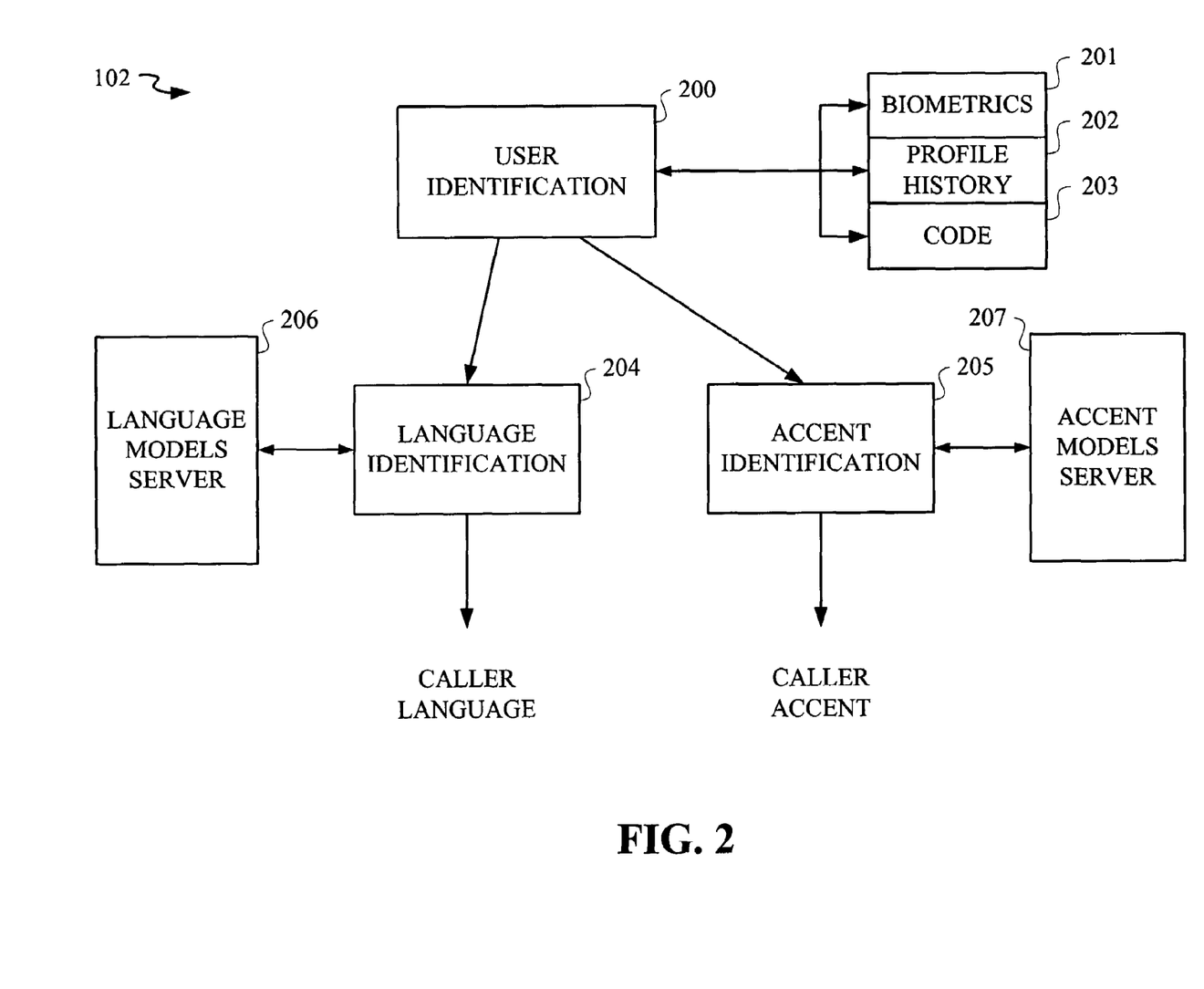
FIG. 2 is a diagram illustrating an automated accent/language identification system according to an embodiment of the present invention.

Referring now to FIG. 2, a diagram illustrates an automated accent/language identification system 102 (FIG. 1) according to an embodiment of the present invention. The first process includes user identification 200. User identification may occur using physical or voice biometrics 201, a profile history 202, or a code 203. Code may refer to software that operates on data such as a combination of data files, e.g., biometrics and user profiles. Code may also refer to direct identification that involves passwords or personal identification numbers (PINs).

After accessing the system, then the caller undergoes language identification 204 and accent identification 205. If the language/accent history of the caller is already known, the caller continues. If the history is not known, language models server 206 and accent models server 207 are utilized.

Language models server 206 and acoustic models server 207 are utilizing to help to perform language model and/or accent identification. For example, language models server may provide a database of typical frequencies of sounds or combinations of sounds for different languages so that the language identification module 204 can then determine in what language these frequencies of the input sounds are the most typical.

Alternatively, the language models server may contain vocabularies from different languages. Then, language identification module 204 may phonetically decode the input speech using an extended phonetic alphabet that covers many languages. Module 204 may then check in what language meaningful words and phrases, stored in language models server 206, could be associated with the string of decoded phones.

Similarly, accent models server 207 may contain typical accent patterns for different languages. Accent identification module 205 can run all these stored accent prototypes for different languages and check whether there is a good match of detected accent acoustic or language irregularities to the stored prototypes. For example, the accent identification module may note such irregularities as a regular absence of the words "the" and "a" in some speech. Then, the accent models server could determine that it is typical for Russians speaking English to drop "the" and "a" in their speech. Thus, accent identification module 205 would identify the speech to be in English but with a Russian accent.

The result of the above operations is the identification of the caller's language and accent. Alternatively, system 102 may identify only the language or only the accent of the caller.

Figure 3:
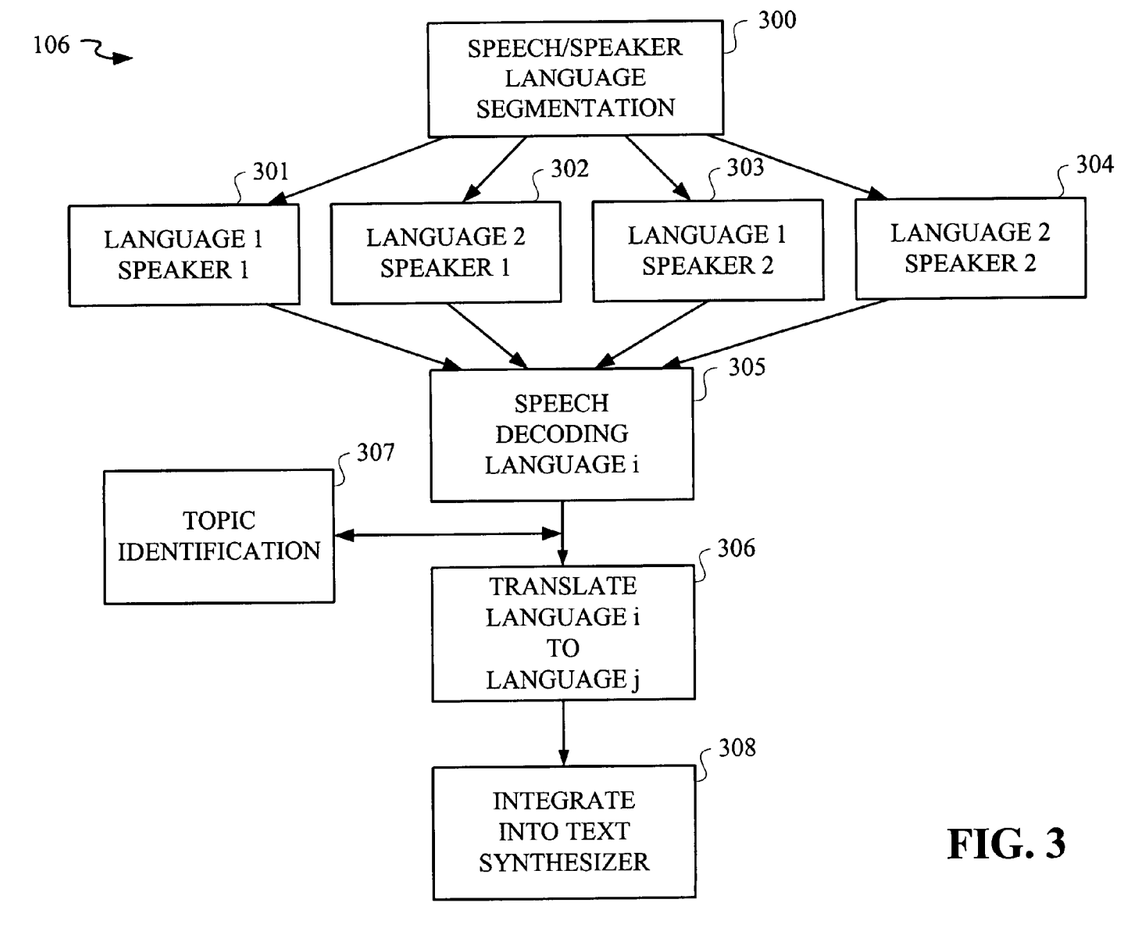
FIG. 3 is a diagram illustrating an automated translation system according to an embodiment of the present invention.

Referring now to FIG. 3, a diagram illustrates an automated translation system 106 (FIG. 1) according to an embodiment of the present invention. More particularly, FIG. 3 illustrates the automatic translation and speech recognition process. Speech/speaker language segmentation 300 divides the speakers (caller and operator). The speakers are organized by language as shown: language 1 and speaker 1 (301); language 2 and speaker 1 (302); language 1 and speaker 2 (303); and language 2 and speaker 2 (304). After the speech is broken down into segments, a speech recognition (i.e., speech decoding) process 305 occurs. The decoded language (language i) is then translated into the appropriate language (language j) 306.

Topic identifier 307 specifies the level of help where the translated data should be allocated. Levels of help in call centers are ranked. The first level is the most simple and common; the second level requires the help of more experienced people; and so on. The higher the level, the higher the experience (and expense) of the help that is provided. Also, on the same level, there can be different experts that can help in specified areas. The lower level of help may serve to identify the higher level expertise and area of help that is needed. But, in accordance with the invention, the lower level also identifies in what language the data on the lower level should be translated in order that the expert in the higher level, to whom translated data will be sent, can understand the speech or text from the lower level.

Finally, the translated language parts are integrated into the text synthesizer 308. Consider the following example.

Assume we have several different people (helpers, e.g., experts in repair of cars) involved that speak in different languages to a customer who has a problem with his car. For example, a customer (Russian) first spoke with a level 1 operator (who is Chinese) and Chinese speech was translated into Russian and, vice versa, Russian speech from a customer was translated into Chinese for a Chinese level 1 helper. This translation process first involves segmentation of recorded acoustic conversation between the customer and helper into segments, where the customer speaks and where the helper speaks. Then, it became apparent that some parts of the discussion between the level 1 helper and the customer should go to an expert in level 2 in one area (for example, to repair brakes) who speaks Spanish and the other part of the communication data between the customer and the level 1 helper should go to the helper of level 2 who is an expert in a computer system in a car and who happens to speak in Portuguese.

Eventually there will be several pieces of data in different languages (textual and acoustics) that are associated with some communication process between customers and helpers. This can be integrated (e.g., for records) in one language. Thus, all pieces of information should be integrated into one connected (synthesized) piece of text (e.g., in English). So the parts of a text (parts of which are related for brakes and are in Russian/Spanish, and other parts for computers which are in Russian/Portuguese) are advantageously integrated into one text (e.g., in English) for storing in archives or for giving to another help level operator who needs to read the whole conversation.

Figure 4:
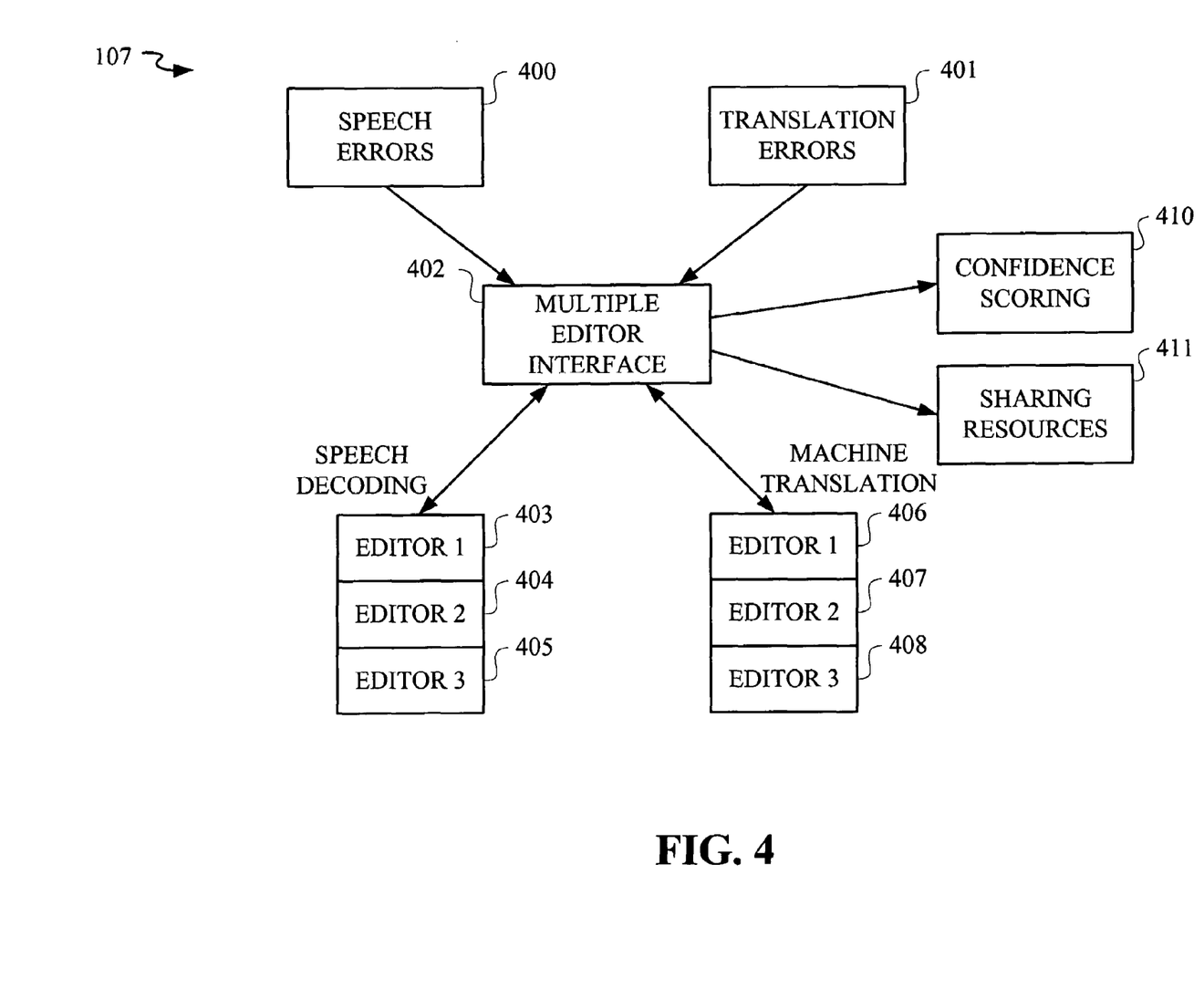
FIG. 4 is a diagram illustrating a multi-purpose editing system according to an embodiment of the present invention.

Referring now to FIG. 4, a diagram illustrates a multi-purpose editing system 107 (FIG. 1) according to an embodiment of the present invention. As shown, speech errors 400 and translation errors 401 are input to multiple editor interface 402. The editor interface is connected to confidence scoring module 410, which provides possible errors in decoding or translation, and sharing resources 411 module, which directs decoded text or translated text to various editors (403-408). The sharing resources allow the editors to focus on various segments of the text.

For example, there exists technology that allows computation of the confusability of automatic speech recognition, decoding or machine translation. In other words, one can estimate the probability that a given acoustic segment was decoded correctly or a given part of text was translated correctly. In order to make editing faster, editors will preferably be looking only at pieces of decoded or translated data that is most confusable and, thus, where there is the higher probability that it is decoded or translated incorrectly. There are several known methods to compute confusability of decoding or translation. For example, one can compute a list of alternative words that closely match to an acoustic segment (in the case of decoding) or a word (in the case of translation). For this list of alternative words, one can compute likelihood scores. If several best alternative words in the list have close likelihood scores, then this increases confusability.

The text that editors must process may be color-coded to facilitate the process. If there are several decoded or translated words that are confusable in some part of a text, then they can be colored differently. For example, one half of confusable words would be colored in red and the other half of confusable words would be colored in green. Then, one editor will focus on verifying red words and the other editor would focus on verifying green words when the text is displayed on their monitors. Verification means, for example, that one editor clicks on red words, and plays audio associated with red words and checks if they decoded correctly. If not, he corrects the wrong words manually. And similarly, the other editor clicks on green words.

Figure 5:
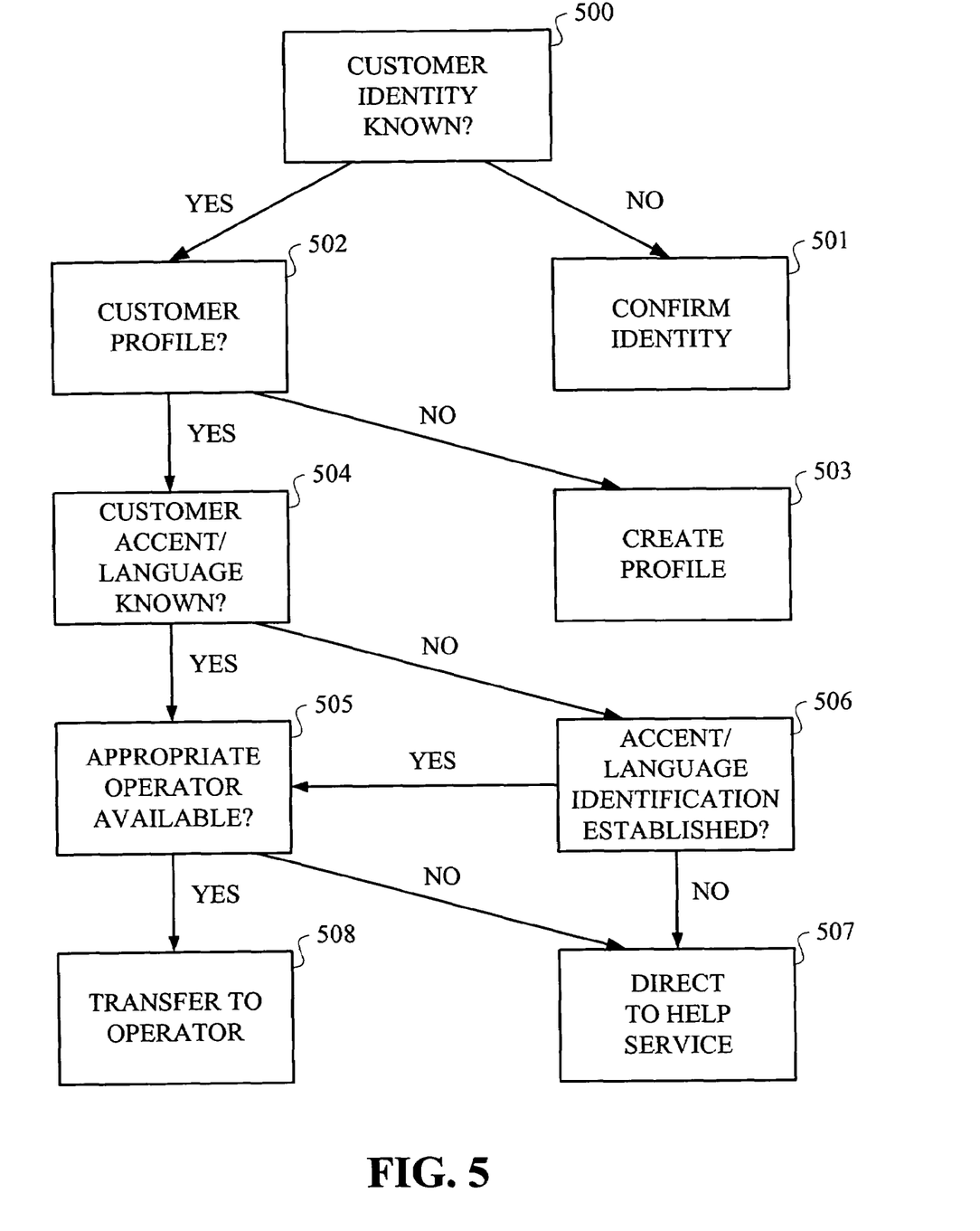
FIG. 5 is a diagram illustrating a call center methodology according to an embodiment of the present invention.

Referring now to FIG. 5, a diagram illustrates a call center methodology according to an embodiment of the present invention In step 500, the methodology determines whether or not the identity of the customer (i.e., caller) is known. If no, then in step 501, the customer's identity is confirmed. This may be done, for example, using biometrical or accent/language data. If yes, then in step 502, the methodology determines whether or not the customer has a profile? If no, then in step 503, the profile is created. If yes, in step 504, the methodology determines whether or not the caller's accent/language is previously known. If yes, then in step 505, the methodology determines whether or not an appropriate accent/language operator is available. If no, then in step 506, the caller's accent/language is automatically established, if possible. If the caller's accent/language can not be established, the caller is directed to a help service in step 507.

If the caller's accent/language is established, then in step 505, the methodology determines whether or not an appropriate accent/language operator is available. If the appropriate accent/language operator is available, the caller is transferred thereto in step 508. If there is no appropriate accent/language operator, the caller is directed to the help service in step 507.

In accordance with the teachings herein, the invention may also provide gradual and non-intrusive switching to a different accent and then to a language between a helper and caller.

For example, assume that a caller starts to speak with a Russian person in pure English (no accent). However, after a few spoken words, the automated accent/language system of the invention detects a Russian accent. It switches the caller to someone (helper) who speaks in Russian. But at the beginning, the helper does not speak in Russian but rather speaks in English with heavy Russian accent (similar to the caller accent). Then, when the two persons speak with the same accent, it soon will be clear whether the caller wants to switch to a Russian accent. This could be clear either from voice biometrics (for example, the caller will be excited when he hears Russian accented voice after speaking with the helper who spoke pure English) or the Russian caller can directly ask "where are you from?" Thus, the invention provides a technique for non-intrusive seamless switching from one kind of operator to others who match a caller in accent and language.

Further, in accordance with the teachings herein, the invention provides automatic translation/summarization of foreign speech between the caller and helper into languages that can be understood by a higher level help. However, it is also to be appreciated that the translation process may be semi-automatic since it may involve a human error editing procedure.

Figure 6:
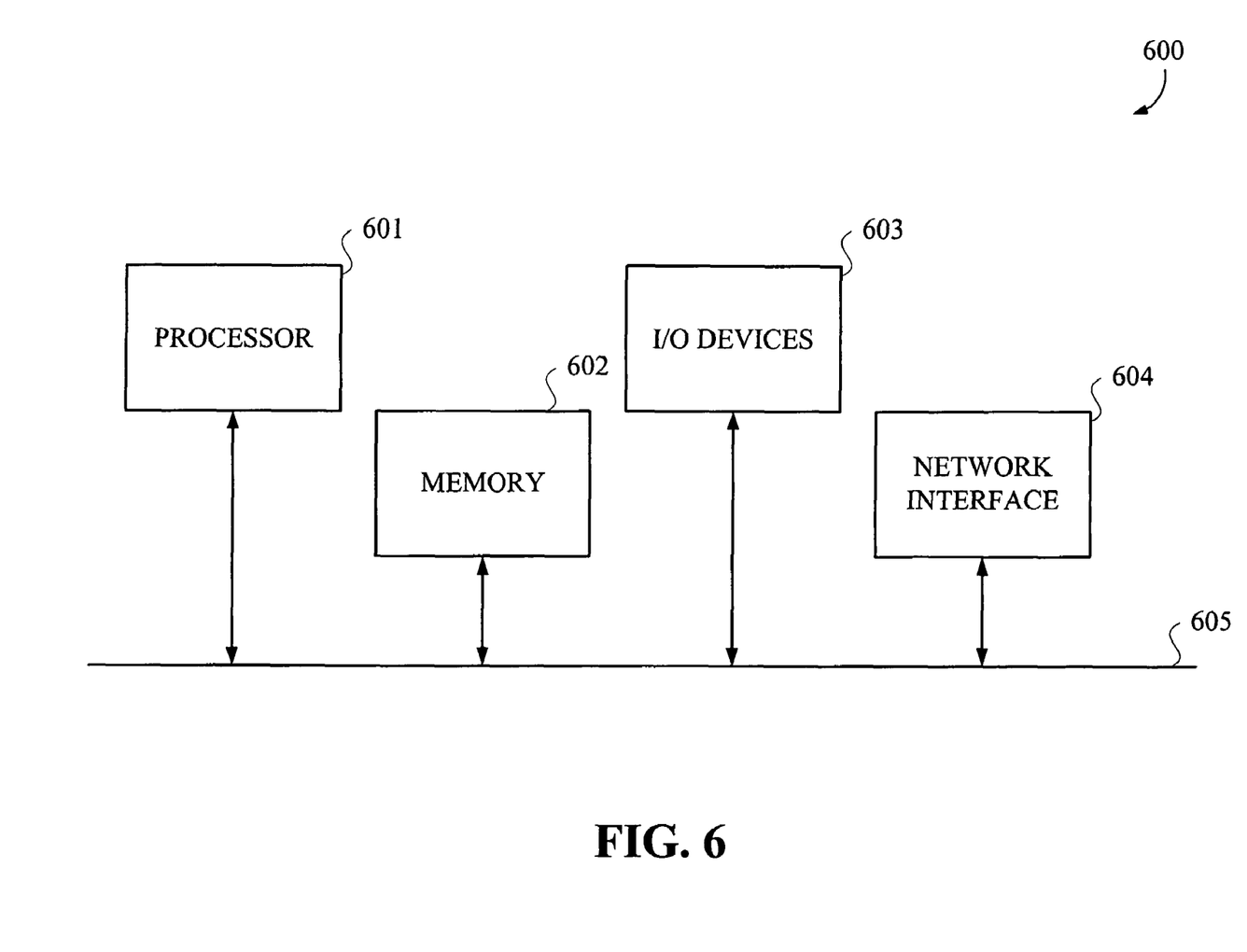
FIG. 6 is a computer system suitable for implementing a call center system according to an embodiment of the present invention.

Referring lastly to FIG. 6, a computer system suitable for implementing a call center system, according to an exemplary embodiment of the present invention, is illustrated. For example, the illustrative architecture of FIG. 6 may be used in implementing any and all of the components and/or steps described in the context of FIGS. 1 through 5.

As shown, the computer system 600 may be implemented in accordance with a processor 601, a memory 602, I/O devices 603, and a network interface 604, coupled via a computer bus 605 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing foreign language communications services. By way of example, a service provider agrees (e.g., via a service level agreement or some informal agreement or arrangement) with a service customer or client to provide foreign language communications services. That is, by way of one example only, the service provider may host the customer's web site and associated applications. Then, in accordance with terms of the contract between the service provider and the service customer, the service provider provides foreign language communications services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing a call received by a call center, comprising the steps of: obtaining a call at the call center; automatically identifying at least one of an accent and a language spoken by a caller making the call; directing the call to an appropriate operator at a first level of the call center based on at least one of the automatically identified accent and the automatically identified language, wherein the appropriate operator of the first level of the call center is at least familiar with at least one of the automatically identified accent and the automatically identified language spoken by the caller; estimating a plurality of costs comprising a cost associated with automatically translating original speech associated with the call and a cost associated with restating the original speech associated with the call into a form that is simpler than the original speech, wherein the speech associated with the call comprises speech attributable to the caller and speech attributable to the operator at the first level; responsive to the estimated plurality of costs, automatically translating at least one of the original speech associated with the call and the restated speech associated with the call from at least one of the automatically identified accent and the automatically identified language spoken by the caller to at least one of an accent and a language understood by an operator at a second level of the call center; and editing one or more portions of the translated speech based at least in part on a confusability of the one or more portions; wherein the step of automatically identifying at least one of an accent and a language spoken by a caller making the call comprises identifying the caller using one or more of biometrics, a profile history, and a code.

2. The method of claim 1, further comprising the step of decoding the speech prior to translating the speech.

3. The method of claim 2, further comprising the step of editing the decoded speech.

4. The method of claim 1, wherein the step of automatically identifying at least one of an accent and a language spoken by a caller making the call further comprises segmenting the original speech by language and speaker.

5. The method of claim 1, wherein the step of automatically identifying at least one of an accent and a language spoken by a caller making the call further comprises decoding at least a portion of the original speech in a particular language.

6. The method of claim 5, wherein the step of automatically identifying at least one of an accent and a language spoken by a caller making the call further comprises translating at least a portion of the decoded speech from one language to another language.

7. The method of claim 6, wherein the step of automatically identifying at least one of an accent and a language spoken by a caller making the call further comprises integrating the translated speech into an integrated text.

8. The method of claim 1, wherein the step of automatically identifying at least one of an accent and a language spoken by a caller making the call further comprises performing topic identification.

9. The method of claim 1, wherein the step of automatically identifying at least one of an accent and a language spoken by a caller making the call further comprises, during caller speech, automatically switching to an operator who speaks with one of an accent and a language that matches the caller.

* * * * *